United States Patent [19]

Bidaud et al.

[11] Patent Number: 5,497,313
[45] Date of Patent: Mar. 5, 1996

[54] SWITCHING METHOD AND APPARATUS FOR INCREASING EFFICIENCY OF AN INDUCTIVE LOAD AND SWITCHING MEANS SUPPLYING THE LOAD

[75] Inventors: Francis Bidaud, DuClair; Sylvain Benoit, Artas; Jacques Plisson, Barentin; Gérard Rilly, Unterkirnach; Gérard Morizot, Villingen; Harald Roth, Munchweiler, all of France

[73] Assignee: L'Unite Hermetique, La Verpilliere, France

[21] Appl. No.: 174,417

[22] Filed: Dec. 28, 1993

[30] Foreign Application Priority Data

Dec. 30, 1992 [FR] France .................. 92 15910

[51] Int. Cl.⁶ ........................... H02M 7/00
[52] U.S. Cl. ............................. 363/125; 363/41
[58] Field of Search ................... 363/125, 26, 41, 363/42; 361/154

[56] References Cited

U.S. PATENT DOCUMENTS 4,580,064  4/1986  Varnovitsky ................ 363/26 X
5,264,775  11/1993  Namuduri et al. ........... 363/41 X

FOREIGN PATENT DOCUMENTS 0363514  4/1990  European Pat. Off. .
3542753  6/1987  Germany .
2125239  2/1984  United Kingdom .

Primary Examiner—Peter S. Wong
Assistant Examiner—Y. Jessica Han
Attorney, Agent, or Firm—Oblon, Spivak, McClelland, Maier & Neustadt

[57] ABSTRACT

A switching method and apparatus for increasing the efficiency of an inductive motor. A switching device connects, according to a PWM process, a D.C. voltage (E) to an inductive motor creating a low-frequency contribution UmLF rising from 0V to the peak voltage at the beginning of each half period T/2. The peak voltage is maintained for at least one sixth of a period T/6 creating a plateau and, then, the switching device connects, according to the PWM process, the D.C. voltage (E) to the inductive motor for the remainder of the half period T/2 creating a low frequency contribution UmLF declining from the peak voltage to 0V. With this arrangement, motor vibration is reduced and efficiency is increased.

9 Claims, 1 Drawing Sheet

SWITCHING METHOD AND APPARATUS FOR INCREASING EFFICIENCY OF AN INDUCTIVE LOAD AND SWITCHING MEANS SUPPLYING THE LOAD

BACKGROUND OF THE INVENTION

This invention concerns a process for a power supply for an inductive load, such as an electric motor, a control device for the power supply to this load embodying this process, and optimizing the efficiency of the load and the device.

DESCRIPTION OF THE PRIOR ART

The principle of a power supply for an inductive load (such as an electric motor) making use of an alternating voltage wave of variable frequency and amplitude is known. A dc voltage source is switched in order to obtain the required shape wave at the motor terminals so as to adapt the motor power supply voltage to its load torque. When the voltage source is alternating, (for example network power) an intermediate module is inserted to create a dc wave that will be switched using a PWM (Pulse Width Modulation) procedure so that the required voltage shape can be applied to the motor terminals. If the voltage source is already dc, it can be switched directly using the PWM process. This technique known to the expert is described in a book by Yvon PEERS entitled "Variation de vitesse" (Speed variation) published by HERMES.

Use of this type of process causes problems that can be categorized in two aspects. The first is related to "low" frequencies, in other words, frequencies of the same order of magnitude as the fundamental natural frequency of the motor voltage or its harmonics. The second is related to "high" frequencies, in other words, at frequencies of the same order of magnitude as the fundamental frequency of PWM switching or its harmonics.

From the point of view of "low" frequencies, the problem encountered is non-uniformity of the output torque; the generation of voltage harmonics creates torque harmonics that disturb the torque, since the air gap flux created in the motor is not perfectly sinusoidal. These torque variations have two types of consequences, namely acoustic and mechanical. Voltage harmonics create torque harmonics that cause vibrations that are annoying to an operator and may be harmful to the motor environment and reduce the efficiency of the motor.

From the point of view of "high" frequencies, the frequency of PWM switching and its harmonics appear in the acoustic and vibration spectra of the motor. Frequencies generated by switching are more annoying when they are in the audible frequency range. In order to attenuate these nuisances, acoustic insulating devices are used that form obstacles between the motor and its environment and that make it necessary to reduce the operating range of the motor.

Moreover, superimposing a PWM process on the motor voltage fundamental has the consequence of reducing the motor efficiency further and increasing temperatures, particularly when the switching frequency is low. Switching the dc voltage wave imposes a series of rising and falling ramps at the switching frequency on the induction. This sawtooth shape is amplified in the magnetic field wave due to the property of the non-linear amplifier formed by the plate. During switching, auxiliary cycles are superimposed on the normal hysteresis cycle of the sinusoidal field, causing iron losses that reduce the efficiency and increase the temperature of the plate, thus imposing a limitation on the operating range of the motor.

A PWM switching process necessarily requires switching of control device power switches, that must be accompanied by switching losses and a reduction in the efficiency of the power electronics. In order to limit temperature rises in these power switches, the size of heat sinks has to be increased, increasing the cost and size if the reliability of the device is to be maintained.

Varying the length of impulses implies that the opening and closing times of power switches are varied. Due to their manufacture, these power switches have a lower closing time limit (ton) and opening time limit (toff) below which they will not work correctly. Due to these limitations when switching the dc voltage E, it will never be possible to obtain a peak value of the synthesized voltage equal to E, the residual being due to minimum ton and toff values.

This is particularly the case when using a sinusoidal type PWM that requires ton and toff values short enough to respect the sinusoidal shape close to the peak. Thus it is possible either to respect the sinusoidal shape in which case the peak value is not equal to E, or to obtain a peak value E but the wave shape is then deformed to become flat, close to its maximum value. Using a sinusoidal type PWM with switching frequencies of the order of 20 kHz and so-called fast power transistors and diodes can obtain 90 to 95% of the voltage E. A peak voltage closer to E can only be achieved by reducing the switching frequency but this leads to hysteresis losses and vibration phenomena described above. Thus two solutions are proposed for a constant motor power. Employing a higher voltage E in order to compensate for the residual is one solution but this requires that the power switches work at higher voltages. The second solution is to modify the motor winding in order to work at a more reliable voltage but in this case it absorbs more current transmitted through the power switches. In both cases the proposed solutions are harmful to power switches.

SUMMARY OF THE INVENTION

This invention can overcome all these disadvantages by using the ingenious characteristics of a voltage wave applied to the terminals of an inductive load obtained by switching the dc voltage.

The purpose of this invention is to supply power to an inductive load wherein the voltage applied to the inductive load terminals is obtained by transforming a dc wave into a wave in which at least one half-period includes a plateau, a special feature of the invention being to apply to inductive load terminals an alternating voltage that has a half-period with the shape of an isosceles trapezoid in which the duration of the plateau is T/6, where T is the duration of the period of the synthesized voltage at the load terminals.

Another purpose of this invention is a device embodying this process.

BRIEF DESCRIPTION OF THE DRAWINGS

This invention will be better understood and additional advantages will become clear from reading the following description illustrated by the following figures.

DESCRIPTION OF A PREFERRED EMBODIMENT

In the following description, the inductive load considered is an electric motor and the voltage Um applied to the terminals of the electric motor has components UmLF and UmHF, Component UmLF is the low frequency voltage at the motor terminals, in other words frequencies of the same order of magnitude as the fundamental frequency of the motor voltage or its harmonics. UmHF is the component with a high frequency voltage at the motor terminals, in other words frequencies of the same order of magnitude as the fundamental frequency of PWM switching or its harmonics.

Figure 1:
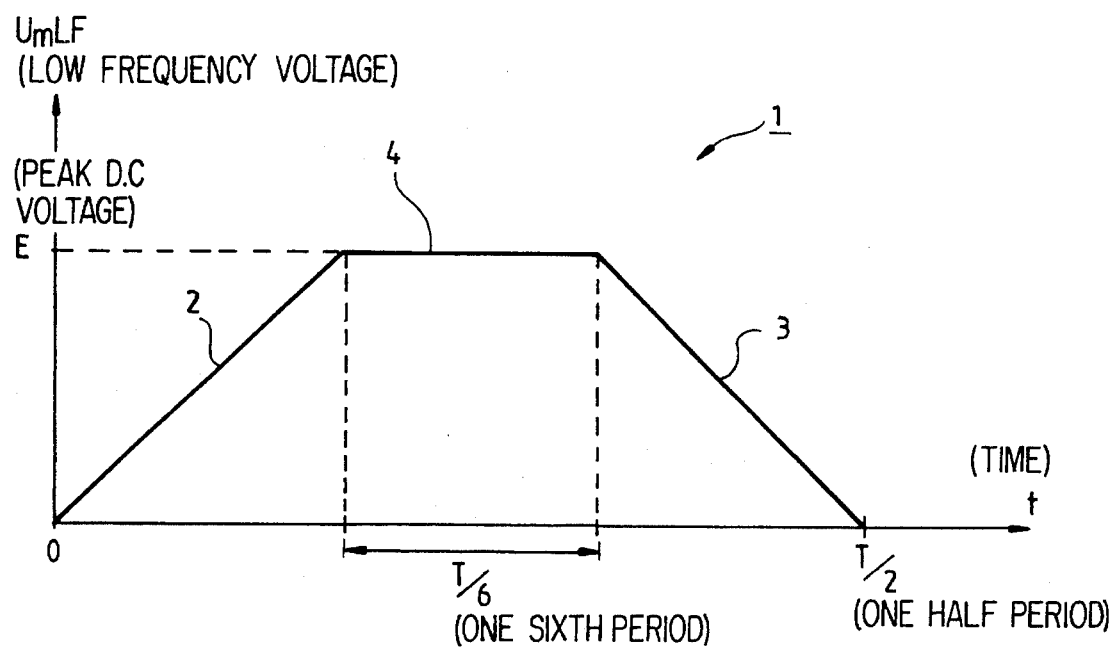
FIG. 1 represents a wave shape output to a motor according to a preferred type of the process according to the invention.

The graph of FIG. 1 shows the time t along the abscissa and the values of the synthesized voltage wave UmLF applied to the motor terminals 8 along the ordinate. This invention consists of generating a voltage wave Um at the motor terminals 8 (obtained by switching a dc voltage E) and has a plateau 4 on at least one half-period, preferably at the peak of this half-period. According to the invention the wave may be alternating and may have any arbitrary shape between each plateau, for example it may be in the shape of a ramp, a sine curve, exponential or tangent curve or developments of any order of sine curve, exponential or tangent curve. Preferably the wave shape chosen will be similar to the shape shown in FIG. 1 in which a particularly interesting shape 1 is chosen on a half-period of wave according to the invention, namely the trapezoid. Rising 2 and falling 3 ramps are obtained by switching a dc voltage E using a known pulse width modulation (PWM) type device.

Since this trapezoidal shape of the UmLF voltage wave requires switching of the dc source voltage E only during ramps 2 and 3, optimum use can be made of the voltage source E by obtaining the same source voltage E at the motor terminals during the plateau period 4. We have seen that using a PWM making use of permanent switching cannot achieve a peak value of the synthesized voltage equal to E due to the limiting power switch closing time ton and opening time toff. Assuming an order of magnitude of 7% of the voltage residual for a wave shape switched close to maximum values, the shape of the UmLF voltage wave has two types of advantages over existing solutions, for the same motor power. The first is to use an approximately 7% lower converter input voltage than when using a wave obtained, for example, with sinusoidal PWM switching, such that the voltage applied to power components is lower. The second is that if the converter input voltage remains constant, the motor can be defined for a lower voltage in the case of a switched voltage shape that would increase the absorbed current by about 7% and therefore increase the current passing through the power components.

Also, this trapezoid shape 1 can reduce switching losses due to the power switches in the device since they are not switched during the entire duration of the plateau 4 such that the efficiency of the device can be increased and the surface area of associated heat sinks and the cost of the device can be reduced.

FIG. 1 shows a preferred shape of a half-period of the trapezoidal wave, namely the isosceles trapezoid 1.

Another important characteristic of the invention is the frequency value used. In a preferred mode of the invention, the switching frequency throughout the ramp duration is higher than 20 kHz. All frequency values may be used during these ramps, however the potential advantages increase for higher switching frequencies, particularly above a value of the order of 10 kHz.

From the point of view of these "high" frequencies, switching output frequencies produce smaller magnitudes of vibration waves that become easier to filter at higher frequencies. Operating the wave switching device at frequencies higher than 20 kHz can avoid the need for additional acoustic insulating devices that would reduce heat exchanges between the motor and its environment. The motor reliability is therefore increased and it may be used within a wider operating range. Also since vibrations are more easily filtered at high frequencies, the design of the coupling element damping function between the motor and its support is simplified.

Moreover, amplitudes of the related hysteresis cycles mentioned above are smaller at these switching frequencies, and iron losses in the motor magnetic core that increase the temperature of the plate are also reduced. The motor efficiency is thus higher than when lower switching frequencies are used.

Although there is no restriction concerning the durations of ramps 2 and 3 or the plateau 4, another important property of the invention is the duration of the plateau of wave UmLF applied to the motor terminals 8 with respect to its period. A trapezoidal wave shape, that may be isosceles, in which the plateau has a duration of T/6 where T is the fundamental period of the voltage wave, UmLF, has no harmonic that contributes more than 3% to the global rms value, and in particular the rank 3 harmonic is practically nonexistent.

This isosceles trapezoid shape with a plateau of T/6 does not add any magnetic air gap voltage harmonics above those obtained when the motor is powered with a pure sine wave.

This special trapezoid shape, like the wave shapes mentioned above with a plateau, can limit torque variations due to harmonic losses in the motor, these harmonic losses being responsible for harmful mechanical and acoustic vibrations at the "low" frequencies mentioned above. A uniform average torque is obtained by creating an air gap flux that is as close as possible to a sine curve by using a motor power supply voltage as close as possible to the fundamental of its Fourier series breakdown. These special features avoid increasing motor harmonic losses, while reducing power losses due to switching of power switches.

Figure 2:
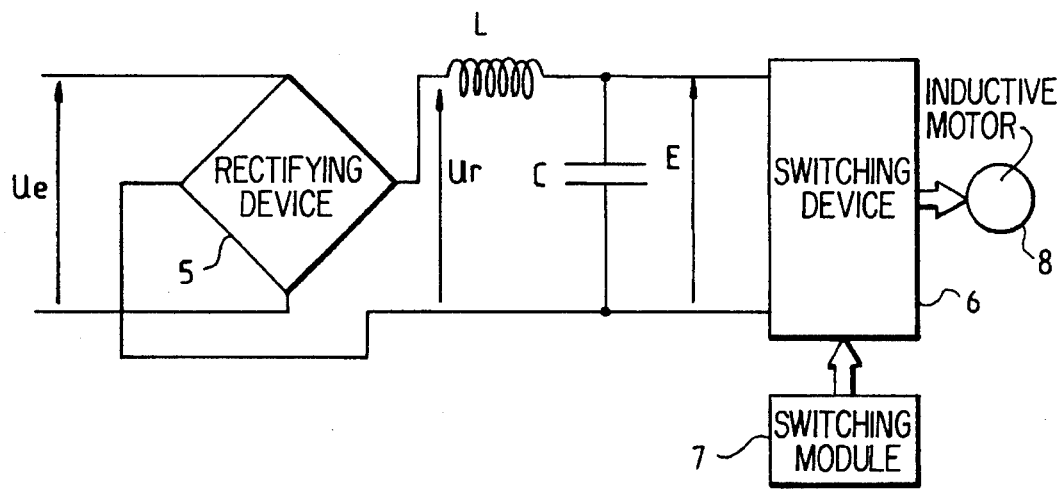
FIG. 2 represents a device for embodying the process according to the invention.

This invention also concerns a device embodying the process described above. This device is shown in FIG. 2.

If the voltage source Ue is alternating rather than direct, a rectifying device 5 converts the alternating voltage Ue into a direct voltage E. This rectifying device 5 may be a conventional diode bridge or any known device, in which the alternating source voltage Ue is applied and which outputs a direct voltage preferably through a filter that may consist of an inductance L that limits current peaks and a capacitance C that filters the rectified voltage.

The direct voltage E thus obtained is applied to a switching device 6 and power diodes controlled by a direct voltage E switching module 7, this module 7 may be a PWM type module. By means of a set of device 6 switch controls known to the expert in the field, this module outputs a voltage UmLF to the motor terminals 8 that has the characteristics shown on FIG. 1. In other words the shape of a half-period of this wave, UmLF, has a plateau preferably located at its peak, and may be trapezoidal, isosceles, or any other shape mentioned above in the description of the process, and obtained by switching the direct voltage E at frequencies preferably above 10 kHz during the duration of the ramps of the synthesized wave. The duration of its plateau may be T/6 where T is the period of the synthesized voltage, UmLF.

This invention applies to all types of inductive loads such as transformers and ac electric motors, with or without a commutator, and particularly to single phase or multiphase asynchronous motors.

What is claimed is:

1. A switching method for increasing an efficiency of an inductive load and switching means, said switching means including a switching device and supplying the load, from a D.C. voltage E, with a resulting voltage, said method comprising the steps of:

switching said switching device according to a high frequency PWM process for connecting said D.C. voltage E to terminals of the inductive load during a first part of each half period T/2 and for creating a rising low frequency contribution UmLF which rises from 0V to a maximum value of the D.C. voltage E;

maintaining the D.C. voltage E connected to the terminals of the inductive load for at least a sixth of the period T/6 during each said half period T/2, said maintaining step creating a plateau in said low frequency contribution with the maximum value of the D.C. voltage E applied to the terminals of the inductive load; and switching said switching device according to a high-frequency PWM process for connecting said D.C. voltage E to the terminals of the inductive load during a remaining part of each said half period T/2 and for creating a declining low frequency contribution UmLF which declines from said maximum value of the D.C. voltage E to 0V.

2. A switching method according to claim 1, wherein said switching device creates an isosceles trapezoidal low frequency contribution UmLF applied to the terminals of said inductive load.

3. A switching method according to claim 1, wherein the switching device is switched at a frequency of at least 10 kHz.

4. A switching apparatus for supplying a switched D.C. voltage E to terminals of an inductive load in order to apply to said inductive load a resulting voltage, said apparatus comprising:

a switching device for applying the D.C. voltage E to said terminals of the inductive load; and a switching module for controlling said switching device according to a high-frequency PWM process to connect the D.C. voltage E to the terminals of said inductive load during a first part of each half period T/2 creating a rising low frequency contribution UmLF which rises from 0V to a maximum value of the D.C. voltage E, to maintain the D.C. voltage E connected to the terminals of the inductive load for at least a sixth of the period T/6 during each said half period T/2 creating a plateau with the maximum value of the D.C. voltage E to the terminals of the inductive load, and to connect said D.C. voltage E to the terminals of the inductive load during a remaining part of each said half period T/2 creating a declining low frequency contribution UmLF which declines from said maximum value of the D.C. voltage E to 0V.

5. A switching apparatus according to claim 4, wherein said switching module controls said switching device for creating an isosceles trapezoidal low frequency contribution UmLF applied to the terminals of said inductive load.

6. A switching apparatus according to claim 4, wherein said switching module controls said switching device at a switching frequency of at least 10 kHz.

7. The switching method according to claim 1, wherein the maintaining step further comprises the step of:

holding the D.C. voltage E connected to the terminals of the inductive load so that the low frequency contribution UmLF has no harmonic which contributes more than 3% of a global rms value.

8. The switching method according to claim 7, wherein a rank 3 harmonic is substantially eliminated.

9. The switching apparatus of claim 4, wherein the rising low frequency contribution UmLF has a duration of T/6, the plateau has a duration of T/6 and the declining low frequency contribution UmLF has a duration of T/6.

* * * * *